United States Patent

Chan et al.

(10) Patent No.: US 10,287,069 B2
(45) Date of Patent: May 14, 2019

(54) VAPORIZING/DISCHARGING CONTAINER, AND FLYING INSECT PEST REPELLENT DEVICE USING THE VAPORIZING/DISCHARGING CONTAINER (71) Applicants: ZHONGSHAN FUJI CHEMICAL CO., LTD., Guangdong (CN); DAINIHON JOCHUGIKU CO., LTD., Osaka (JP); THE YANKEE CANDLE COMPANY, INC., South Deerfield, MA (US)

(72) Inventors: Chi Wai Chan, Guangdong (CN); Koji Nakayama, Osaka (JP); Frederick A. Enko, Westfield, MA (US); Cheriyan B. Thomas, Farmington, CT (US)

(73) Assignees: ZHONGSHAN FUJI CHEMICAL CO., LTD., Guangdong (CN); DAINIHON JOCHUGIKU CO., LTD., Osaka (JP); THE YANKEE CANDLE COMPANY, INC., South Deerfield, MA (US)

(*) Notice: Subject to any disclaimer, the term of this patent is extended or adjusted under 35 U.S.C. 154(b) by 194 days.

(21) Appl. No.: 14/895,348

(22) PCT Filed: Jan. 24, 2014

(86) PCT No.: PCT/CN2014/071339
§ 371 (c)(1),
(2) Date: Dec. 2, 2015

(87) PCT Pub. No.: WO2014/194684
PCT Pub. Date: Dec. 11, 2014

(65) Prior Publication Data
US 2016/0107809 A1 Apr. 21, 2016

(30) Foreign Application Priority Data

Jun. 8, 2013 (CN) .......................... 2013 1 0228825

(51) Int. Cl.
A01M 1/20 (2006.01)
B65D 41/04 (2006.01)
(Continued)

(52) U.S. Cl.
CPC ......... B65D 50/043 (2013.01); A01M 1/2055 (2013.01); B65D 41/0471 (2013.01);
(Continued)

(58) Field of Classification Search
CPC ......... A01M 1/2055; A61L 9/04–9/048; A61L 9/12; B65D 41/0471; B65D 43/0225;
(Continued)

(56) References Cited

U.S. PATENT DOCUMENTS 3,979,001 A   9/1976  Bogert
4,270,664 A * 6/1981  Buono ................. B65D 50/046
                                                    215/216
(Continued)

FOREIGN PATENT DOCUMENTS

CN  2463344    12/2001
CN  102379273  3/2012
(Continued)

OTHER PUBLICATIONS

First Office Action issued for the Chinese patent application No. 201480032222.X along with machine translation thereof.
(Continued)

Primary Examiner — Alexander M Valvis
Assistant Examiner — Cody J Lieuwen
(74) Attorney, Agent, or Firm — Renner, Otto, Boisselle & Sklar, LLP (57) ABSTRACT A vaporizing/discharging container 100 is provided that can properly vaporize and discharge a volatile substance in use, and prevent tampering by children, etc. The vaporizing/discharging container 100 for vaporizing and discharging a
(Continued)

volatile substance into the outside, includes a main body 10 configured to contain the volatile substance, and a closure member 20 having a vapor discharging hole 21 for the volatile substance, and configured to be screwed and attached onto the main body 10. A pair of temporary lock mechanisms 30 (31, 32) configured to engage with each other so that resistance occurs against a direction in which the closure member 20 is rotated backward after the closure member 20 is screwed onto the main body 10, are provided between the closure member 20 and the main body 10, and at least one of the temporary lock mechanisms 30 (31, 32) is formed in the shape of steps.

15 Claims, 7 Drawing Sheets

(51) Int. Cl.
    *B65D 43/02*     (2006.01)
    *B65D 47/32*     (2006.01)
    *B65D 50/04*     (2006.01)

(52) U.S. Cl.
    CPC ......... *B65D 43/0225* (2013.01); *B65D 47/32* (2013.01); *B65D 2215/00* (2013.01)

(58) Field of Classification Search
    CPC ..... B65D 47/32; B65D 50/043–50/048; B65D 2215/00–2215/02; B65D 51/1611; B65D 51/1605; Y10T 292/42; Y10T 292/432; Y10T 292/438; Y10S 292/38
    USPC ................. 239/34–57, 59, 60; 215/307, 330, 215/216–218, 221; 206/1.5
    See application file for complete search history.

(56) References Cited

U.S. PATENT DOCUMENTS

| | | | |
|---|---|---|---|
| 5,014,913 A * | 5/1991 | Hoyt | A61L 9/12 239/45 |
| 6,244,518 B1 * | 6/2001 | Pogue | A01M 29/12 215/204 |
| 7,527,159 B2 * | 5/2009 | Brozell | B65D 41/0471 215/222 |
| 2003/0070348 A1 * | 4/2003 | Spragins | A01M 1/026 43/121 |
| 2007/0264291 A1 | 11/2007 | Scialdone et al. | |
| 2010/0200533 A1 | 8/2010 | Rice | |
| 2012/0267279 A1 * | 10/2012 | Lesniak | A61L 9/12 206/524.1 |

FOREIGN PATENT DOCUMENTS

| | | |
|---|---|---|
| CN | 202175288 | 3/2012 |
| CN | 203353910 | 12/2013 |
| JP | 1982017955 | 1/1982 |
| JP | 1984-191925 U | 12/1984 |
| JP | 1996-112339 | 5/1996 |
| JP | 2002-234804 | 8/2002 |
| JP | 2003225295 | 8/2003 |
| JP | 2005-087286 | 4/2005 |
| JP | 2010-280394 | 12/2010 |
| TW | M404019 | 5/2011 |

OTHER PUBLICATIONS

First Office Action issued for the Korean patent application No. 10-2015-7035378 along with machine translation thereof.
PCT/CN2014/071339; PCT International Search Report of the International Searching Authority dated Mar. 10, 2014.
First Office Action issued for the Japanese Patent Application No. 2016-517133 dated Mar. 21, 2017 along with machine translation thereof.
Decision of Refusal issued for the Korean Patent Application No. 10-2015-7035378 dated May 15, 2017 along with machine translation thereof.
The First Office Action issued for TW 103118572 dated May 18, 2016 along with machine translation of a main part thereof.

\* cited by examiner

VAPORIZING/DISCHARGING CONTAINER, AND FLYING INSECT PEST REPELLENT DEVICE USING THE VAPORIZING/DISCHARGING CONTAINER

The present application is a U.S. National Stage Application based on and claiming benefit of and priority under 35 U.S.C. § 371 to International Application No. PCT/CN2014/071339, filed 24 Jan. 2014, which in turn claims benefit of and priority to Chinese Application No. 201310228825.4, filed 8 Jun. 2013, the entirety of each of which is hereby incorporated herein by reference.

TECHNICAL FIELD

The present invention relates to a vaporizing/discharging container that vaporizes and discharges a volatile substance into the outside, and a flying insect pest repellent device using the vaporizing/discharging container.

BACKGROUND ART

Insect repellents that are volatile at room temperature are available on the market to control or repel insect pests. Commercial products that contain a volatile air freshener (aroma chemical component) in addition to an insect repellent have also recently been developed. Commercial products dealing with a substance having volatility (volatile substance), such as an insect repellent, air freshener, etc., are usually sold in the form of a container that is configured so that the volatile substance is put in the container body, and the container opening portion is sealed using a seal, etc. Just before use, the seal is removed from the container opening portion, and a closure is attached to the container body. The closure is attached to the container body in various known fashions, such as screwing, friction-fitting, gluing, etc. To prevent tampering by children, etc., the closure needs not to be easily removed from the container body once attached to the container body. Here, screw containers are widely used as a container for a volatile substance, because once the closure is attached to the container body, it is difficult to remove the closure in the vertical direction, and it is easy to attach the closure to the container body.

Among conventional screw containers is an air freshener container that is configured so that the opening portion of the container body can be opened and closed by screwing a cap onto a threaded portion provided on the container body (see, for example, Patent Document 1). In the air freshener container of Patent Document 1, the opening portion of the container body in an unused condition is sealed using a sealing member while an air freshener is contained in the container body, and just before use, the cap is once removed from the container body, the sealing member is peeled off to open the opening portion, and the cap is attached to the container body, so that the air freshener can be vaporized and discharged into the outside.

Incidentally, there is also a known container that is configured so that the closure is screwed onto the opening portion of the container body, and in addition, a lock mechanism is provided between the container body and the closure, although the container is not dedicated to a volatile substance (see, for example, Patent Document 2). The container of Patent Document 2 has two engagement protrusions that are provided side by side in the vicinity of a terminal end of a thread on the container body, and one engagement protrusion that is provided in the vicinity of a terminal end of a thread on the closure. When the closure is screwed all the way onto the container body, the protrusion on the closure fits into a space between the two protrusions on the container body, so that the closure is not easily removed from the container body.

CITATION LIST

Patent Literature

Patent Document 1: Japanese Unexamined Patent Application Publication No. 2003-225295
Patent Document 2: Japanese Unexamined Utility Model Application Publication No. S57-17955

SUMMARY OF INVENTION

Technical Problem

Containers for containing a volatile substance are required to: be tightly sealed so that the volatile substance is properly vaporized and discharged while the volatile substance is prevented from leaking, except for through predetermined vapor discharging holes; have safety that prevents tampering by children, etc.; be compatible with a volatile substance; etc.

In this regard, in the air freshener container of Patent Document 1, the opening portion of the container in an unused condition is sealed using a sealing member so that the contained substance is not released into the outside, and therefore, safety may be ensured when the air freshener container is not used. However, just before use, the sealing member is peeled off to open the opening portion of the container body, and the cap is engaged with the protruding portion of a side surface of the container body. Therefore, a child can easily remove the cap from the container body with his or her strength. Note that Patent Document 1 does not teach or suggest that the air freshener container has a lock mechanism or the like for preventing removal of the cap.

The container of Patent Document 2 has a lock mechanism that is implemented by protrusions between the container body and the closure, and therefore, may have the effect of preventing tampering by children, etc., when the container is not opened. However, the container is assumed to contain a volatile substance, and therefore, cannot be directly used as a vaporizing/discharging container. To vaporize and discharge a volatile substance contained in the container into the outside, it is necessary to partly open the closure. In this case, the lock mechanism is not effective, and therefore, unfortunately, the closure can be easily removed. In addition, a volatile substance can leak out through a small space between the container body and the closure. Thus, when a lock mechanism is only simply provided, it is difficult for the container to properly function as a vaporizing/discharging container.

With the above problems in mind, the present invention has been made. It is an object of the present invention to provide a vaporizing/discharging container that can properly vaporize and discharge a volatile substance in use, and can prevent tampering by children, etc. It is also an object of the present invention to provide a flying insect pest repellent device using the vaporizing/discharging container.

Solution to Problem

To achieve the object, a vaporizing/discharging container according to the present invention is a vaporizing/discharging container for vaporizing and discharging a volatile substance into the outside, including a main body configured to contain the volatile substance, and a closure member having a vapor discharging hole for the volatile substance, and configured to be screwed and attached onto the main body. A pair of temporary lock mechanisms configured to engage with each other so that resistance occurs against a direction in which the closure member is rotated backward after the closure member is screwed onto the main body, are provided between the closure member and the main body, and at least one of the temporary lock mechanisms is formed in the shape of steps.

According to the vaporizing/discharging container thus configured, a pair of temporary lock mechanisms configured to engage with each other so that resistance occurs against a direction in which the closure member is rotated backward after the closure member is screwed onto the main body, are provided between the closure member and the main body. Therefore, when the closure member is screwed onto the main body, the temporary lock mechanisms causes resistance, so that the closure member is substantially prevented from being rotated backward, and therefore, tampering by children, etc., can be prevented. Here, the temporary lock mechanisms are paired. At least one of the temporary lock mechanisms is formed in the shape of steps. Therefore, force is applied in a stepwise manner by the closure member being screwed onto the main body, and therefore, the user can feel and recognize the tightened state of the closure member. In addition, in such a stepwise tightening of the closure member, the closure member can be tightened using smaller force compared to when the closure member is tightened with a single action, and therefore, resistance can be reliably caused to occur between the closure member and the main body while the closure member is easily tightened.

In the vaporizing/discharging container of the present invention, the temporary lock mechanisms are preferably provided at a portion on a circumference between the closure member and the main body.

According to the vaporizing/discharging container thus configured, the temporary lock mechanisms are provided at a portion on a circumference between the closure member and the main body. Therefore, an extra object is not provided between the closure member and the main body, and therefore, a space is less likely to occur between the main body and the closure member when the closure member is tightened to the main body. Therefore, the volatile substance is less likely to leak from the container, except for through the vapor discharging hole.

In the vaporizing/discharging container of the present invention, preferably, when the closure member is screwed 1-1.5 revolutions after the closure member is aligned with the main body, the temporary lock mechanisms are engaged with each other.

According to the vaporizing/discharging container thus configured, resistance can be caused to occur between the closure member and the main body when the closure member is screwed 1-1.5 revolutions after the closure member is aligned with the main body. Therefore, it takes less effort to reliably tighten the closure member.

In the vaporizing/discharging container of the present invention, the temporary lock mechanisms are preferably engaged with each other with a tightening torque of 10 kgf·m or more.

According to the vaporizing/discharging container thus configured, the temporary lock mechanisms are engaged with each other with a tightening torque of 10 kgf·m or more. Therefore, a normal adult is allowed to reliably tighten and loosen the closure. In addition, the tightening torque of 10 kgf·m or more can prevent tampering by children, etc.

In the vaporizing/discharging container of the present invention, a pair of main lock mechanisms configured to engage with each other to prevent the closure member from being rotated backward after the closure member is further screwed and moved over the temporary lock mechanisms, are preferably provided between the closure member and the main body.

According to the vaporizing/discharging container thus configured, in addition to the temporary lock mechanisms, a pair of main lock mechanisms for preventing the closure member from being rotated backward are provided. The main lock mechanisms are also paired. When the closure member is further screwed by overcoming the resistance of the temporary lock mechanisms, the pair of main lock mechanisms are engaged with each other to prevent the closure member from being rotated backward. Therefore, the closure can be tightened so that not only children but also adults cannot open the closure with their strength. Therefore, false opening of the closure, and leakage of the volatile substance contained in the main body, can be reliably prevented.

In the vaporizing/discharging container of the present invention, the main lock mechanisms are preferably engaged with each other with a tightening torque of 13 kgf·m or more.

According to the vaporizing/discharging container thus configured, the main lock mechanisms are engaged with each other with a tightening torque of 13 kgf·m or more. Therefore, tampering by children and false locking operation can be prevented, and in addition, a normal adult is allowed to perform locking operation. Therefore, safety and convenience in use can be achieved.

In the vaporizing/discharging container of the present invention, the closure member is preferably formed of a material having a modulus of elasticity higher than the modulus of elasticity of the main body.

According to the vaporizing/discharging container thus configured, the closure member is formed of a material having a modulus of elasticity higher than the modulus of elasticity of the main body. Therefore, when the closure member is screwed onto the main body so that the pair of temporary lock mechanisms or the pair of main lock mechanisms are in contact with each other, the closure member can be elastically deformed to be reliably put into an engaged state. Also, when the closure member is tightened to the main body, the closure member and the main body are tightly attached to each other due to the elasticity of the closure member. As a result, a space is less likely to occur between the closure member and the main body, and therefore, leakage of the volatile substance can be reliably prevented.

In the vaporizing/discharging container of the present invention, the closure member preferably includes a packing that is formed of a material more flexible than a material for the main body.

According to the vaporizing/discharging container thus configured, the closure member includes a packing that is formed of a material more flexible than a material for the main body. Therefore, when the closure member is screwed and attached onto the main body, the closure member is tightly attached to the main body with the packing being interposed therebetween. As a result, the tightening performance of the closure member with respect to the main body can be improved, and the vaporizing/discharging container that is an integration of the closure member and the main body can be stabilized.

In the vaporizing/discharging container of the present invention, the volatile substance preferably has a vapor pressure of 0.01-50 Pa at 20° C.

According to the vaporizing/discharging container thus configured, the volatile substance has a vapor pressure of 0.01-50 Pa at 20° C. The vaporizing/discharging container is particularly suitable for an insect repellent, air freshener, etc., that are volatile at room temperature.

To achieve the object, a flying insect pest repellent device according to the present invention is a flying insect pest repellent device using any one of the above vaporizing/discharging containers, in which the volatile substance is an aqueous gel bead type flying insect pest repellent that is a water absorbent polymer containing an absorbed flying insect pest repellent aroma chemical composition including a flying insect pest repellent component, a repellent effect sustaining component, and water, and the volatile substance is contained in the flying insect pest repellent device.

According to the flying insect pest repellent device thus configured, an aqueous gel bead type flying insect pest repellent having the flying insect pest repellent effect is contained as a volatile substance in the vaporizing/discharging container of the present invention. Therefore, a flying insect pest repellent device having good safety and convenience can be provided.

BRIEF DESCRIPTION OF DRAWINGS

FIG. 1(a) shows the vaporizing/discharging container with a closure member being removed from a main body. FIG. 1(b) shows the closure member as viewed from below.

FIG. 2(a) shows a state in which the temporary lock mechanisms are not yet engaged with each other. FIG. 2(b) shows a state in which the temporary lock mechanisms are partly engaged with each other. FIG. 2(c) shows a state in which the temporary lock mechanisms are fully engaged with each other.

FIG. 3(a) shows the vaporizing/discharging container with a closure member being removed from a main body. FIG. 3(b) shows the closure member as viewed from below.

FIG. 4(a) shows a state in which the main lock mechanisms are not yet engaged with each other. FIG. 4(b) shows a state in which the main lock mechanisms are partly engaged with each other. FIG. 4(c) shows a state in which the main lock mechanisms are fully engaged with each other.

DESCRIPTION OF EMBODIMENTS

Embodiments related to a vaporizing/discharging container according to the present invention will now be described with reference to FIGS. 1-6. A flying insect pest repellent device according to the present invention will be briefly described with reference to FIG. 7. Note that the present invention is not intended to be limited to configurations described in the embodiments below or shown in the drawings.

First Embodiment

Figure 1:
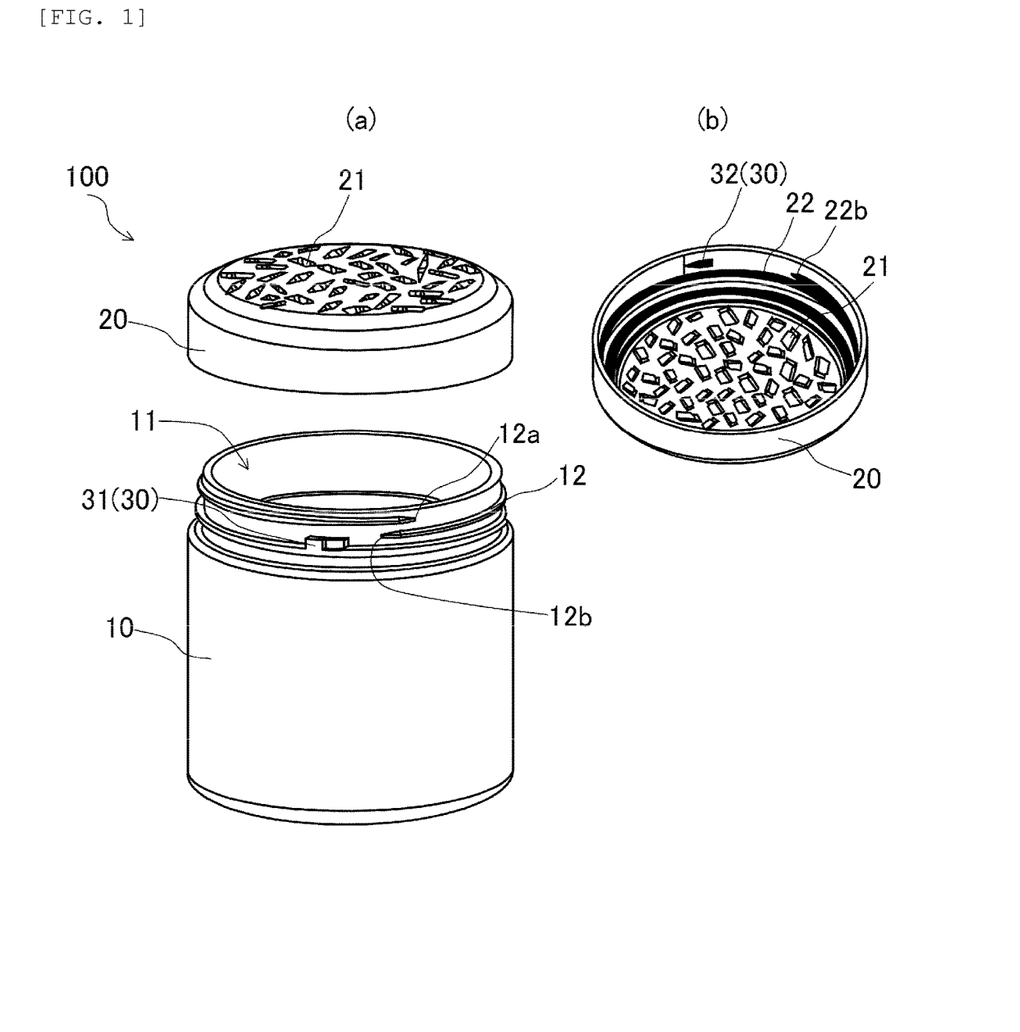
FIG. 1 is a perspective view of a vaporizing/discharging container according to a first embodiment.

FIG. 1 is a perspective view of a vaporizing/discharging container 100 according to a first embodiment of the present invention. FIG. 1(a) shows the vaporizing/discharging container 100 with a closure member 20 being removed from a main body 10. FIG. 1(b) shows the closure member 20 as viewed from below. The vaporizing/discharging container 100 is a container that is used to vaporize and discharge a volatile substance described below into the outside. The vaporizing/discharging container 100 includes the main body 10 and the closure member 20.

The main body 10, which is in the shape of a cylinder having an opening portion 11 and a closed bottom end, can contain a volatile substance described below. A main body threaded portion 12 (described below) for allowing the closure member 20 to be screwed and attached thereonto is formed on an outer circumferential surface of the main body 10 in the vicinity of the opening portion 11. The main body threaded portion 12 has a length (a distance from a start end 12a to a terminal end 12b of the main body threaded portion 12) that is equal to 1-1.5 times the outer circumference of the main body 10. A main body temporary lock portion 31 is provided at a predetermined distance from the terminal end 12b on an imaginary extension from the terminal end 12b of the main body threaded portion 12. The main body temporary lock portion 31 is combined with a closure member temporary lock portion 32 (described below) provided on the closure member 20 to form a pair of temporary lock mechanisms 30.

The main body 10 may be formed of a material that does not alter a volatile substance contained therein and is not degraded, eroded, or corroded, etc., by the contained volatile substance. Examples of such a material include thermoplastic resins such as polyethylene terephthalate (PET), polybutylene terephthalate (PBT), polypropylene (PP), polyethylene (PE), polystyrene (PS), polymethylmethacrylate (PMMA), polyphenylene ether (PPE), polyamide (PA), polycarbonate (PC), acrylonitrile-butadiene-styrene copolymer (ABS), polyphenylene sulfide (PPS), polyether ether ketone (PEEK), polyether ketone ketone (PEKK), polyoxymethylene (POM), etc., and thermosetting resins such as phenol resin (PF), urea resin (UF), melamine resin (MF), epoxy resin (EP), polyurethane resin (PUR), etc. Of these resins, preferable is polyethylene terephthalate (PET), which has good strength and transparency. Note that when the volatile substance includes an organic solvent, etc., the resin is likely to be dissolved in the solvent, and therefore, the main body 10 may be formed of an inorganic material such as metal, glass, ceramics, etc., instead of the resin.

When the main body 10 is formed of a resin material, the main body 10 may be produced by a molding technique, such as injection molding, extrusion molding, blow molding, compression molding, etc. When the main body 10 is produced by molding, the main body threaded portion 12 and the main body temporary lock portion 31 are simultaneously formed on the main body 10.

As to the size of the main body 10, it is preferable that the main body 10 should have a diameter of about 6-9 cm so that a normal adult can grasp the main body 10, but it is difficult for a child to grasp the main body 10, in order to prevent tampering by children, etc. It is preferable that the main body 10 should have a height of about 5-10 cm, in order to ensure the stability of the main body 10. It is preferable that the main body 10 should have a transparent or translucent external appearance so that a state of the contained volatile substance can be visually checked from the outside. Note that when the volatile substance is easily decomposed by light, the main body 10 may be colored with any color, or a light shield sticker may be attached to the main body 10.

The closure member 20 is configured as a disc-shaped cylindrical member that covers the opening portion 11 of the main body 10. A closure member threaded portion 22 that can be engaged with the main body threaded portion 12 of the main body 10 is formed on an inner circumferential surface of the closure member. A closure member temporary lock portion 32 is provided at a predetermined distance from a terminal end 22b of the closure member threaded portion 22 on an imaginary extension from the terminal end 22b of the closure member threaded portion 22. The closure member temporary lock portion 32 is combined with the main body temporary lock portion 31 provided on the main body 10 to form the pair of temporary lock mechanisms 30 as described above. The temporary lock mechanisms 30 will be described in detail below. Vapor discharging holes 21 for discharging the volatile substance contained in the main body 10 into the outside is provided in an upper surface of the closure member 20. The vapor discharging holes 21 may have any shape, and there may be any number of the vapor discharging holes 21.

The closure member 20 may be formed of a material that does not alter a volatile substance contained in the main body 10 and is not degraded, eroded, or corroded, etc., by the contained volatile substance. Such a material is similar to those described above that are used to form the main body 10. Note that it is preferable that the material for the closure member 20 should be selected, depending on the material for the main body 10, so that the closure member 20 has a higher modulus of elasticity than that of the main body 10. For example, when polyethylene terephthalate (PET) is selected as the material for the main body 10, polypropylene (PP), which has a higher modulus of elasticity than that of polyethylene terephthalate (PET), can be selected as the material for the closure member 20, for example.

The closure member 20 can be produced using various molding techniques similar to those for the main body 10. When the closure member 20 is produced by molding, the closure member threaded portion 22 and the closure member temporary lock portion 32 are simultaneously formed on the closure member 20.

The size of the closure member 20 is set according to the main body 10. It is preferable that the closure member 20 should have a diameter of about 5-9 cm so that the closure member 20 reliably covers the opening portion 11 of the main body 10. It is preferable that the closure member 20 should have a height of about 1-3 cm so that the closer member 20 is reliably screwed and attached onto the main body threaded portion 12 of the main body 10. The closure member 20 may have a transparent or translucent external appearance, as with the main body 10. Alternatively, the closure member 20 may be colored with any color, or a light shield sticker may be attached to the closure member 20.

Figure 2:
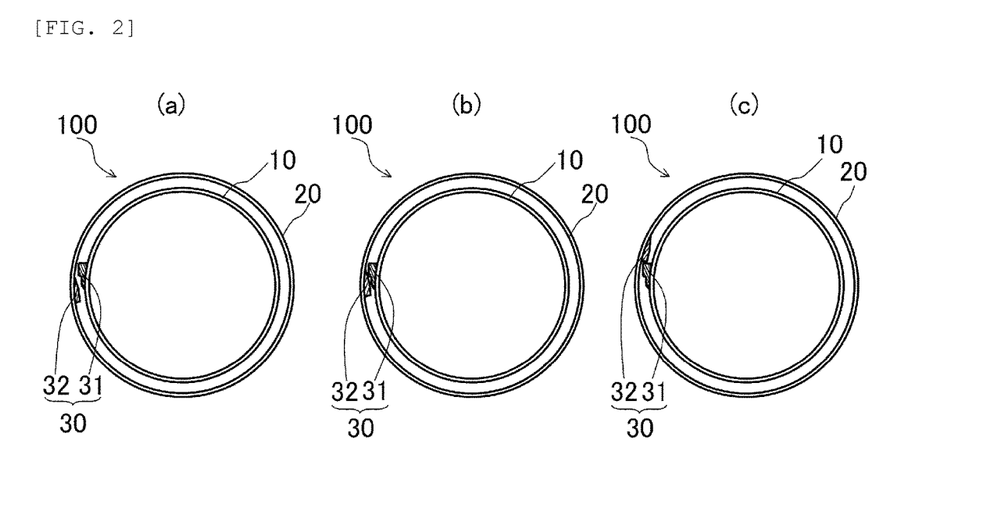
FIG. 2 is a cross-sectional view of the vaporizing/discharging container of the first embodiment taken at a height position of a pair of temporary lock mechanisms, showing how the closure member is screwed onto the main body so that the temporary lock mechanisms are engaged with each other.

The pair of temporary lock mechanisms 30, which is a feature of the vaporizing/discharging container 100 of the present invention, will be described. In the vaporizing/discharging container 100, the closure member 20 is screwed onto the main body 10 so that the main body temporary lock portion 31 on the main body 10 and the closure member temporary lock portion 32 on the closure member 20 are engaged with each other to function as the pair of temporary lock mechanisms 30. FIG. 2 is a cross-sectional view of the vaporizing/discharging container 100 taken at a height position of the pair of temporary lock mechanisms 30, showing how the closure member 20 is screwed onto the main body 10 so that the temporary lock mechanisms 30 are engaged with each other. FIG. 2(*a*) shows a state in which the temporary lock mechanisms 30 are not yet engaged with each other. FIG. 2(*b*) shows a state in which the temporary lock mechanisms 30 are partly engaged with each other. FIG. 2(*c*) shows a state in which the temporary lock mechanisms 30 are fully engaged with each other. In the cross-sectional view of FIG. 2, the main body threaded portion 12 and the closure member threaded portion 22 are not shown for ease of understanding of states of the temporary lock mechanisms 30.

The vaporizing/discharging container 100 of this embodiment is configured so that the main body temporary lock portion 31 provided on the main body 10 is formed in the shape of steps protruding outward (i.e., protruding toward the inner circumferential surface of the closure member 20), and the closure member temporary lock portion 32 provided on the closure member 20 is formed in the shape of a wedge protruding inward (i.e., protruding toward the outer circumferential surface of the main body 10). To screw the main body 10 onto the closure member 20, the closure member 20 is aligned with the opening portion 11 of the main body 10. At this time, as shown in FIG. 2(*a*), the closure member 20 is rotated with respect to the main body 10 until the closure member temporary lock portion 32 on the closure member 20 meets and faces the main body temporary lock portion 31 on the main body 10. Next, the closure member 20 is screwed onto the main body 10 so that the closure member 20 is further rotated with respect to the main body 10, and as a result, as shown in FIG. 2(*b*), the closure member temporary lock portion 32 is in contact with the main body temporary lock portion 31. At this time, because the main body temporary lock portion 31 is formed in the shape of steps (two steps in this embodiment), the wedge-shaped closure member temporary lock portion 32 moves onto the first step of the main body temporary lock portion 31 while the closure member 20 is elastically deformed. Thereafter, when the closure member 20 in this state is further screwed, the closure member 20 is further elastically deformed, so that the closure member temporary lock portion 32 moves onto the second step of the main body temporary lock portion 31. Thereafter, when the closure member temporary lock portion 32 has moved over the main body temporary lock portion 31, the closure member 20 returns to the original state from the elastically deformed state, and as shown in FIG. 2(*c*), the main body temporary lock portion 31 is fully engaged with the closure member temporary lock portion 32. Although this engaged state is a temporarily locked state in which the closure member 20 can be removed from the main body 10, a back portion of the closure member temporary lock portion 32 is in contact with a back portion of the main body temporary lock portion 31 over a predetermined range, and therefore, resistance occurs against a direction in which the closure member 20 is rotated backward. Therefore, the closure member 20 is substantially prevented from becoming loose with respect to the main body 10.

As described above, the pair of temporary lock mechanisms 30 are engaged with each other due to the elastic deformation of the closure member 20, and therefore, it is preferable that the closure member 20 should have a higher modulus of elasticity than that of the main body 10. When materials for the closure member 20 and the main body 10 are selected so that the modulus of elasticity of the closure member 20 is higher than that of the main body 10, the closure member 20 is elastically deformed after the closure member 20 is screwed onto the main body 10 so that the main body temporary lock portion 31 is in contact with the closure member temporary lock portion 32, whereby the pair of temporary lock mechanisms 30 are reliably put into an engaged state. In addition, when the closure member 20 is tightened to the main body 10, the elasticity of the closure member 20 causes the closure member 20 and the main body 10 to be tightly attached to each other, and as a result, a space is less likely to occur between the closure member 20 and the main body 10, and the leakage of the volatile substance can be reliably prevented.

The engaged state (temporarily locked state) in this embodiment is achieved when the closure member 20 is screwed 1-1.5 revolutions after the closure member 20 is aligned with the main body 10. Therefore, it takes less effort to reliably tighten the closure member 20. In the engaged state, the main body temporary lock portion 31 and the closure member temporary lock portion 32 function as the pair of temporary lock mechanisms 30 to substantially prevent the closure member 20 from being easily rotated backward with respect to the main body 10 so that the closure member 20 becomes loose with respect to the main body 10. Therefore, tampering by children, etc., can be prevented.

In this embodiment, of the pair of temporary lock mechanisms 30, the main body temporary lock portion 31 is formed in the shape of steps, and therefore, force is applied in a stepwise manner by the closure member 20 being screwed onto the main body 10, and therefore, the user can feel and recognize the tightened state of the closure member 20 until the temporarily locked state is achieved. In addition, in such a stepwise tightening of the closure member 20, the closure member 20 can be tightened using smaller force compared to when the closure member 20 is tightened with a single action, and therefore, resistance can be reliably caused to occur between the closure member 20 and the main body 10, while the closure member 20 is easily tightened. Note that, of the pair of temporary lock mechanisms 30, the closure member temporary lock portion 32 may be formed in the shape of steps, which can provide a similar effect.

In this embodiment, as shown in FIG. 2, the main body temporary lock portion 31 and the closure member temporary lock portion 32 that form the pair of temporary lock mechanisms 30 are provided at a portion of a circumference between the closure member 20 and the main body 10. Specifically, the single main body temporary lock portion 31 is provided on the outer circumferential surface of the main body 10, and the single closure member temporary lock portion 32 is provided on the inner circumferential surface of the closure member 20. In this case, an extra object is not provided between the closure member 20 and the main body 10, and therefore, a space is less likely to occur between the main body 10 and the closure member 20 when the closure member 20 is tightened to the main body 10. Therefore, in the vaporizing/discharging container 100, the volatile substance is less likely to leak, except for through the vapor discharging holes 21 of the closure member 20. Note that, in the present invention, a plurality of the pairs of temporary lock mechanisms 30 may be provided on a circumference between the closure member 20 and the main body 10. When a plurality of temporary lock mechanisms 30 are provided, the main body temporary lock portion 31 and the closure member temporary lock portion 32 are more firmly engaged with each other. Therefore, when it is desirable that greater resistance should be caused to occur between the main body 10 and the closure member 20, it is effective to provide a plurality of temporary lock mechanisms 30. When a plurality of temporary lock mechanisms 30 are provided, it is preferable that the temporary lock mechanisms 30 are arranged at regular intervals on a circumference between the closure member 20 and the main body 10, in order to allow the temporary lock mechanisms 30 to have equal engagement forces.

In this embodiment, the main body temporary lock portion 31 and the closure member temporary lock portion 32 that form the pair of temporary lock mechanisms 30 are configured to be engaged with each other with a tightening torque of 10 kgf·m or more. Although the tightening torque of 10 kgf·m allows a normal adult to tighten and open the closure member 20, such a torque does not allow a child to easily loosen the closure member 20. Therefore, tampering by children, etc., can be effectively prevented.

Second Embodiment

Figure 3:
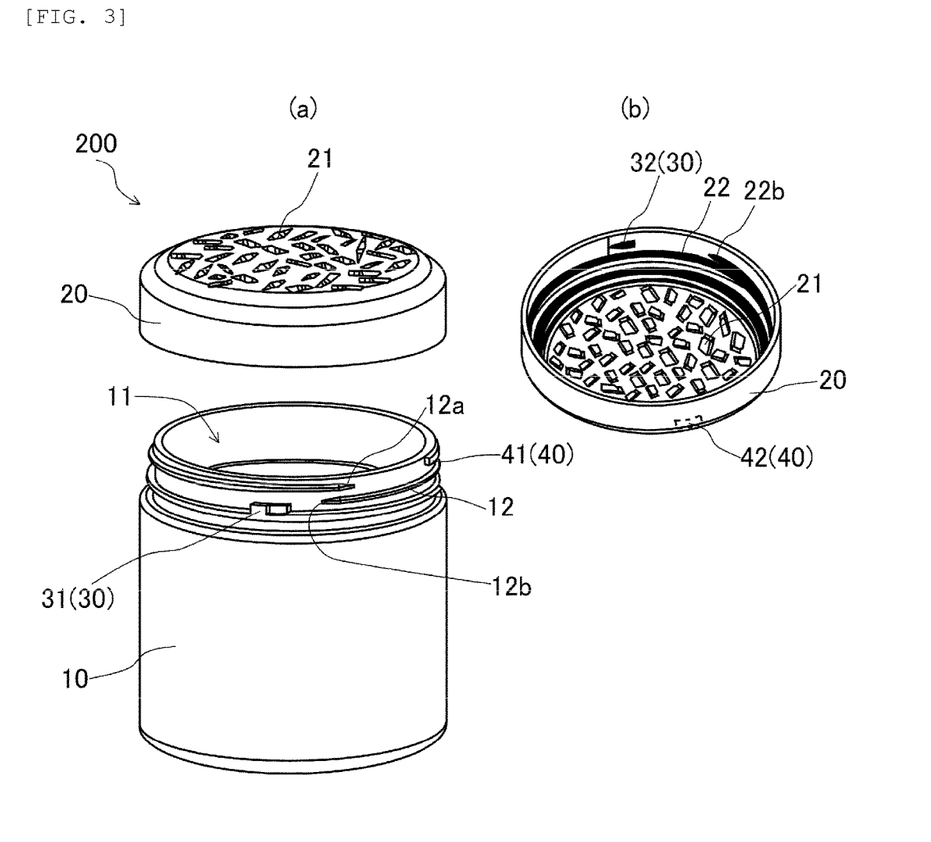
FIG. 3 is a perspective view of a vaporizing/discharging container according to a second embodiment.

FIG. 3 is a perspective view of a vaporizing/discharging container 200 according to a second embodiment of the present invention. FIG. 3(a) shows the vaporizing/discharging container 200 with a closure member 20 being removed from a main body 10. FIG. 3(b) shows the closure member 20 as viewed from below. The vaporizing/discharging container 200 of the second embodiment is the vaporizing/discharging container 100 of the first embodiment that further includes a pair of main lock mechanisms 40. Therefore, the components other than the main lock mechanisms 40 are similar to those of the first embodiment and will not be described in detail.

The main lock mechanisms 40 are provided to prevent the closure member 20 from being rotated backward after the closure member 20 is fully tightened to the main body 10. The main lock mechanisms 40 include a main body main lock unit 41 provided on the main body 10, and a closure member main lock unit 42 provided on the closure member 20. The main body main lock unit 41 is a wedge-shaped member protruding outward (i.e., protruding toward the inner circumferential surface of the closure member 20) that is located on an imaginary extension from the terminal end 12b of the main body threaded portion 12 and further than the main body temporary lock portion 31. The closure member main lock unit 42 is a wedge-shaped member protruding inward (i.e., protruding toward the outer circumferential surface of the main body 10) that is located on an imaginary extension from the terminal end 22b of the closure member threaded portion 22 and further than the closure member temporary lock portion 32. To put the main lock mechanisms 40 into an engaged state (fully locked state), the closure member 20 is screwed onto the main body 10 so that the closure member temporary lock portion 32 is engaged with the main body temporary lock portion 31, and from this state, the closure member 20 is further screwed so that the closure member main lock unit 42 is engaged with the main body main lock unit 41. A procedure of fully locking the vaporizing/discharging container 200 using the main lock mechanisms 40 will now be described with reference to FIG. 4.

Figure 4:
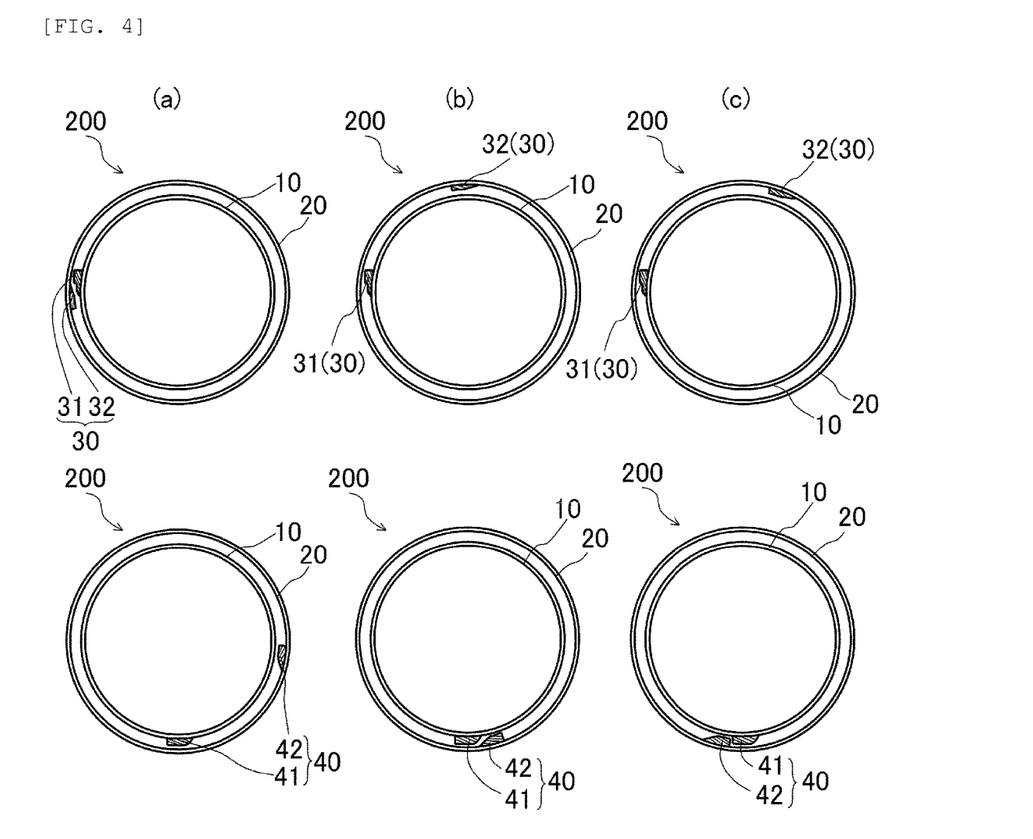
FIG. 4 is a cross-sectional view of the vaporizing/discharging container of the second embodiment taken at a height position of a pair of temporary lock mechanisms and a pair of main lock mechanisms, showing how the closure member is screwed onto the main body so that the main lock mechanisms are engaged with each other.

FIG. 4 is a cross-sectional view of the vaporizing/discharging container 200 taken at a height position of the temporary lock mechanisms 30 and the main lock mechanisms 40, showing how the closure member 20 is screwed onto the main body 10 so that the pair of main lock mechanisms 40 are engaged with each other. FIG. 4(a) shows a state in which the main lock mechanisms 40 are not yet engaged with each other. FIG. 4(b) shows a state in which the main lock mechanisms 40 are partly engaged with each other. FIG. 4(c) shows a state in which the main lock mechanisms 40 are fully engaged with each other. In the cross-sectional view of FIG. 4, the main body threaded portion 12 and the closure member threaded portion 22 are not shown for ease of understanding of states of the temporary lock mechanisms 30 and the main lock mechanisms 40.

As can be seen from FIG. 4, the main body main lock unit 41 is located about 90 degrees away from the main body temporary lock portion 31 as viewed from above. In contrast to this, the closure member main lock unit 42 is located about 180 degrees away from the closure member temporary lock portion 32 as viewed from above. Thus, the main body main lock unit 41 and the closure member main lock unit 42 are located at different positions separated by a predetermined angle, and therefore, the pair of temporary lock mechanisms 30 are engaged with each other before the pair of main lock mechanisms 40 are engaged with each other. Specifically, as shown in FIG. 4(a), immediately before the pair of temporary lock mechanisms 30 are engaged with each other, the main body main lock unit 41 and the closure member main lock unit 42 included in the pair of main lock mechanisms 40 are separated by an angle of about 90 degrees. Next, the pair of temporary lock mechanisms 30 are engaged with each other, and the closure member temporary lock portion 32 is then moved forward from the position of the main body temporary lock portion 31. As a result, as shown in FIG. 4(b), the closure member main lock unit 42 is moved to a position immediately in front of the main body main lock unit 41, facing the main body main lock unit 41. Thereafter, as shown in FIG. 4(c), the closure member 20 is further screwed onto the main body 10, so that the closure member main lock unit 42 is moved over the main body main lock unit 41, and therefore, a fully locked state is achieved. In the fully locked state, a rear portion of the closure member main lock unit 42 and a rear portion of the main body main lock unit 41 are substantially entirely in contact with each other, so that the closure member 20 is prevented from being rotated backward. Therefore, the closure member 20 cannot be substantially removed from the main body 10 by an adult's strength, much less a child's strength. Note that a tightening torque required to engage the main body main lock unit 41 with the closure member main lock unit 42 is preferably set to 13 kgf·m or more. As a result, tampering by children and false locking operation can be prevented, and a normal adult is allowed to perform locking operation. Therefore, safety and convenience can be simultaneously achieved in the use of the vaporizing/discharging container 200.

Third Embodiment

Figure 5:
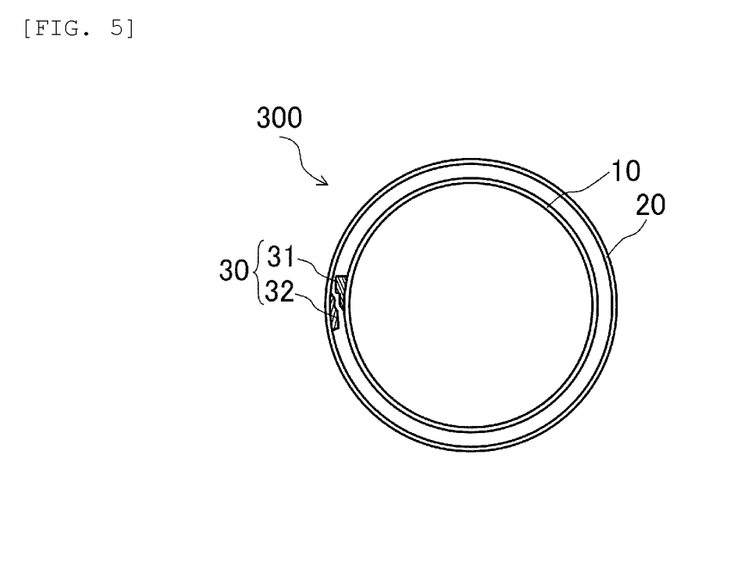
FIG. 5 is a cross-sectional view of a vaporizing/discharging container according to a third embodiment.

FIG. 5 is a cross-sectional view of a vaporizing/discharging container 300 according to a third embodiment of the present invention. In the cross-sectional view of FIG. 5, the main body threaded portion 12 and the closure member threaded portion 22 are not shown for ease of understanding of a state of the temporary lock mechanisms 30. The vaporizing/discharging container 300 of the third embodiment is similar to the vaporizing/discharging container 100 of the first embodiment, except that the main body temporary lock portion 31 and the closure member temporary lock portion 32 included in the pair of temporary lock mechanisms 30 are both formed in the shape of steps. Therefore, the vaporizing/discharging container 300 of the third embodiment will not be described in detail or shown in the drawings.

Even when the main body temporary lock portion 31 and the closure member temporary lock portion 32 included in the pair of temporary lock mechanisms 30 are both formed in the shape of steps, advantages, such as that the user can feel and recognize the tightened state of the closure member 20, and that resistance can be reliably caused to occur between the closure member 20 and the main body 10 while the closure member 20 is easily tightened, can be similarly achieved. In addition, when the main body temporary lock portion 31 and the closure member temporary lock portion 32 are both formed in the shape of steps, the user can more clearly feel stepwise application of force as the steps of the two portions are engaged with each other, and therefore, it is easier to check how firmly the closure member 20 is tightened.

<Tight Attachment Structure of Vaporizing/Discharging Container>

Figure 6:
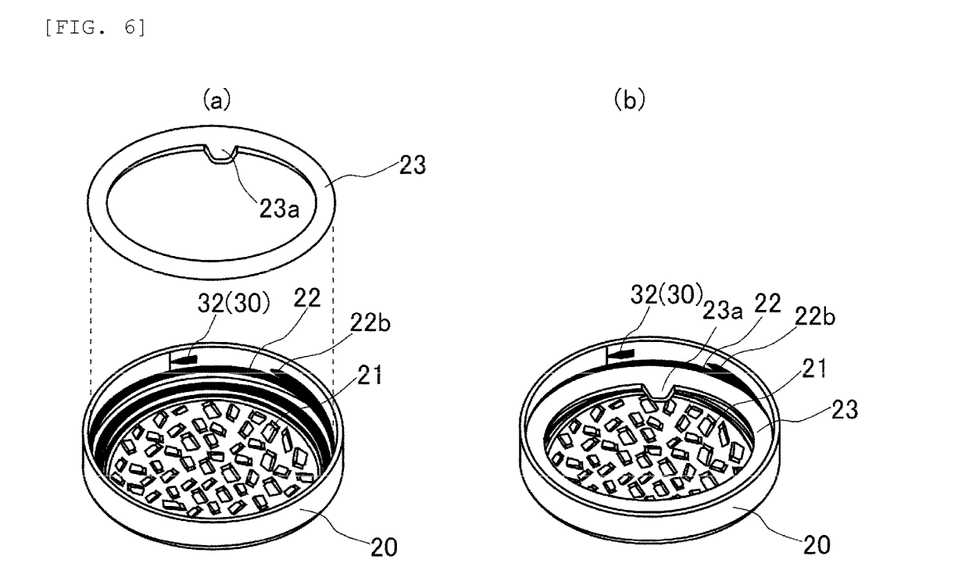
FIG. 6 is a perspective view showing a closure member on which a packing is provided as a tight attachment structure, as viewed from below.

In the vaporizing/discharging containers 100, 200, and 300 of the above embodiments, a tight attachment structure may be provided to improve the tightening performance and stability of the closure member 20 with respect to the main body 10. FIG. 6 is a perspective view showing the closure member 20 on which a packing 23 is provided as the tight attachment structure, as viewed from below. FIG. 6 shows an example in which the packing 23 is provided on the closure member 20 of the vaporizing/discharging container 100 according to the first embodiment. FIG. 6(a) shows a state in which the packing 23 is not yet attached. FIG. 6(b) shows a state in which the packing 23 is attached. The packing 23 has an annular shape so that the packing 23 is in contact with an inner surface of the closure member 20, and the packing 23 will be made contact with the opening portion of the main body 10 when the closure member 20 is attached to the main body 10. Also, a tab portion 23a that is pulled so that the packing 23 is removed from the closure member 20 is formed on an inner surface of the ring of the packing 23. When the closure member 20 is screwed and attached onto the main body 10 while the packing 23 is attached to the closure member 20, the main body temporary lock portion 31 on the main body 10 and the closure member temporary lock portion 32 on the closure member 20 are engaged with each other, and at this time, the closure member 20 is tightly attached to the main body 10 with the packing 23 being interposed therebetween. As a result, the tightening performance of the closure member 20 with respect to the main body 10 can be improved, and in addition, the vaporizing/discharging container 100 that is an integration of the closer member 20 and the main body 10 can be stabilized. The packing 23 provided on the closure member 20 is preferably formed of a material that is similar to or more flexible than that of the main body 10, in order to achieve highly tight attachment. Examples of such a material include rubber materials such as silicone rubber, fluorine rubber, styrene-butadiene rubber, natural rubber, etc., resin materials such as polyethylene terephthalate (PET), polybutylene terephthalate (PBT), polypropylene (PP), polyethylene(PE), etc., etc. Note that the tight attachment structure provided in the vaporizing/discharging container 100 may be any structure that can be used to improve the tightening performance and stability of the closure member 20 with respect to the main body 10. Therefore, instead of the packing 23, a sticky material such as grease, etc., may be applied to an inner surface of the closure member 20, for example.

<Volatile Substance>

The vaporizing/discharging container 100 of the present invention can be used as a flying insect pest repellent device that is used to repel flying insect pests such as mosquitoes, black flies, nonbiting midges, flies, small flies, etc. In this case, the vaporizing/discharging container 100 contains a flying insect pest repellent having volatility. The flying insect pest repellent may be directly contained in the vaporizing/discharging container 100. However, if the volatility of the flying insect pest repellent is high, it may be difficult to control how much the flying insect pest repellent is vaporized and discharged from the container. Therefore, to easily handle the flying insect pest repellent, it is preferable that the flying insect pest repellent should be dissolved in water in an appropriate amount to formulate an aqueous solution, which is then held in gel beads, i.e., the flying insect pest repellent should be contained in the form of aqueous gel beads. The aqueous gel bead type flying insect pest repellent is formulated by causing a water absorbent polymer to absorb a flying insect pest repellent aroma chemical composition including a flying insect pest repellent component, a repellent effect sustaining component, and water. In this case, although the flying insect pest repellent component is a volatile substance, the flying insect pest repellent component or the flying insect pest repellent aroma chemical composition containing the flying insect pest repellent component is herein described as a volatile substance. As the volatile substance, selected is one that has a vapor pressure of 0.01-50 Pa at 20° C. The flying insect pest repellent component, which is all or a portion of the volatile substance, will be described.

The flying insect pest repellent component includes:
(a) at least one aroma chemical component selected from acetic ester compounds represented by $$CH_3\text{—COO—}R_1 \qquad (I)$$

($R_1$: an alcohol residue having 6-12 carbon atoms) and/or allyl ester compounds represented by $$R_2\text{—}CH_2\text{—COO—}CH_2\text{—}CH=CH_2 \qquad (II)$$

($R_2$: an alkyl, alkoxy, cycloalkyl, cycloalkoxy, or phenoxy group having 4-7 carbon atoms); and
(b) at least one aroma chemical component selected from monoterpene alcohols, or aromatic alcohols having 10 carbon atoms.

Examples of the acetic ester compounds represented by the general formula (I) include p-tert-butylcyclohexyl acetate, o-tert-butylcyclohexyl acetate, p-tert-pentylcyclohexyl acetate, tricyclodecenyl acetate, benzyl acetate, phenylethyl acetate, styralyl acetate, anisyl acetate, cinnamyl acetate, terpinyl acetate, dihydroterpinyl acetate, linalyl acetate, ethyllinalyl acetate, citronelyl acetate, geranyl acetate, neryl acetate, bornyl acetate, isobornyl acetate, etc. These acetic ester compounds may be used alone or in combination.

Examples of the allylester compounds represented by the general formula (II) include allyl hexanoate, allyl heptanoate, allyl octanoate, allyl isobutyloxy acetate, allyl n-amyloxy acetate, allyl cyclohexyl acetate, allyl cyclohexyl propionate, allyl cyclohexyloxy acetate, allyl phenoxy acetate, etc. These allyl ester compounds may be used alone or in combination.

Representative examples of the monoterpene alcohol or the aromatic alcohol having 10 carbon atoms include terpineol, geraniol, dihydromyrcenol, borneol, menthol, citronellol, nerol, linalool, ethyl linalool, thymol, eugenol, p-menthane-3,8-diol, etc. These monoterpene alcohols or these aromatic alcohols having 10 carbons may be used alone or in combination.

To the flying insect pest repellent aroma chemical composition, the following additives may be suitably added as a flying insect pest repellent aroma chemical component, in addition to the above aroma chemical components: for example, monoterpene hydrocarbons such as limonene, etc.; monoterpene ketones such as menthone, carvone, pulegone, camphor, damascone, etc.; monoterpene aldehydes such as citral, citronellal, neral, perillaldehyde, etc.; ester compounds such as cinnamyl formate, geranyl formate, etc.; phenylethyl alcohol; diphenyl oxide; indolarome; etc. Moreover, the following various essential oils containing the above aroma chemical components may be suitably added: for example, jasmine oil, neroli oil, peppermint oil, bergamot oil, orange oil, geranium oil, petitgrain oil, lemon oil, citronella oil, lemongrass oil, cinnamon oil, eucalyptus oil, lemon eucalyptus oil, thyme oil, etc.

The flying insect pest repellent aroma chemical composition preferably contains at least one glycol and/or glycol ether having a vapor pressure of 0.2-20 Pa at 20° C. as a component for sustaining the repellent effect after the flying insect pest repellent aroma chemical is vaporized and discharged. Specific examples of the glycol and/or glycol ether include propylene glycol (10.7 Pa), dipropylene glycol (1.3 Pa), tripropylene glycol (0.67 Pa), diethylene glycol (3 Pa), triethylene glycol (1 Pa), 1,3-butylene glycol, hexylene glycol (6.7 Pa), benzyl glycol (2.7 Pa), diethylene glycol monobutyl ether (3 Pa), dipropylene glycol monobutyl ether, and tripropylene glycol monomethyl ether, where the value in parentheses following the name of a substance represents a vapor pressure at 20° C. Of these repellent effect sustaining components, dipropylene glycol is preferably used. Note that the above glycols and/or glycol ethers may be used alone or in combination.

The flying insect pest repellent aroma chemical composition may contain other functional components such as insecticide components, air freshener components, antibacterial and antifungal components, etc. Examples of the insecticide components include empenthrin, profluthrin, transfluthrin, metofluthrin, etc., which are of the family of pyrethroids which vaporize at room temperature. A representative example of the air freshener components is an extract of a plant selected from Poaceae, Theaceae, Ginkgoaceae, Oleaceae, Moraceae, Rutaceae, Malpighiaceae, and Ebenaceae. Also, leaf alcohol, leaf aldehyde, etc., which are called "green odor," may be added to impart a relaxing effect. These functional components may be used alone or in combination.

To formulate the aqueous gel bead type flying insect pest repellent, the flying insect pest repellent aroma chemical composition (impregnation solution) with which a water absorbent polymer is impregnated preferably contains a surfactant. The surfactant allows the flying insect pest repellent aroma chemical composition to be reliably held within the gel beads, thereby contributing to sustained release of the flying insect pest repellent aroma chemical composition. As a result, the flying insect pest repellent effect can be exhibited stably over a long period of time. Examples of the surfactant include non-ionic surfactants such as polyoxyethylene hydrogenated castor oil, polyoxyethylene higher alkyl ethers (polyoxyethylene lauryl ether, polyoxyethylene oleyl ether, etc.), polyoxyethylene alkyl phenyl ethers, polyoxyethylene higher fatty acid esters, polyoxyethylene sorbitan fatty acid esters, polyoxyethylene glycerin fatty acid esters, polyoxyethylene polyoxypropylene alkyl ethers, etc., and higher alkyl amine oxide surfactants such as lauryl amine oxide, stearyl amine oxide, lauric acid amide propyldimethylamine oxide, etc. These surfactants may be used alone or in combination.

The water absorbent polymer is preferably an acrylate water absorbent polymer. Acrylate water absorbent polymers have good water absorbency, and can absorb water in an amount equivalent to 100 times or more its own weight. An acrylate water absorbent polymer having a particle size of about 2 mm may expand to a particle size of about 10 mm while the polymer is maintained generally transparent even after absorbing the impregnation solution. Examples of the acrylate water absorbent polymer include acrylic acid-acrylate copolymers (acrylic acid-sodium acrylate copolymer, acrylic acid-potassium acrylate copolymer, etc.), and a copolymer of acrylamide and acrylic acid or a salt thereof.

The aqueous gel bead type flying insect pest repellent is formulated as follows, for example. A predetermined amount of a water absorbent polymer is put in a transparent container with an opening portion that has an appropriate capacity, and then, an impregnation solution containing the flying insect pest repellent aroma chemical composition is poured into the container. At this time, as the container for formulating the aqueous gel bead type flying insect pest repellent, the vaporizing/discharging container of the present invention may be used. In this case, it is not necessary to move the formulated aqueous gel bead type flying insect pest repellent to the vaporizing/discharging container. To formulate the aqueous gel bead type flying insect pest repellent, the water absorbent polymer and the impregnation solution are put into the container either in this order or in reverse order. Also, the impregnation solution may additionally and optionally contain a solvent, a stabilizer (e.g., BHT, etc.), a preservative (e.g., isothiazoline preservatives, etc.), a bittering agent (e.g., Bitrex, etc.), a pH adjusting agent, a colorant, etc.

Examples of the solvent used in formulating the aqueous gel bead type flying insect pest repellent include lower alcohols such as ethanol, isopropanol, etc., ketone solvents, ester solvents, hydrocarbon solvents such as normal paraffin, isoparaffin, etc., etc. These solvents may be used alone or in combination.

<Flying Insect Pest Repellent Device>

Figure 7:
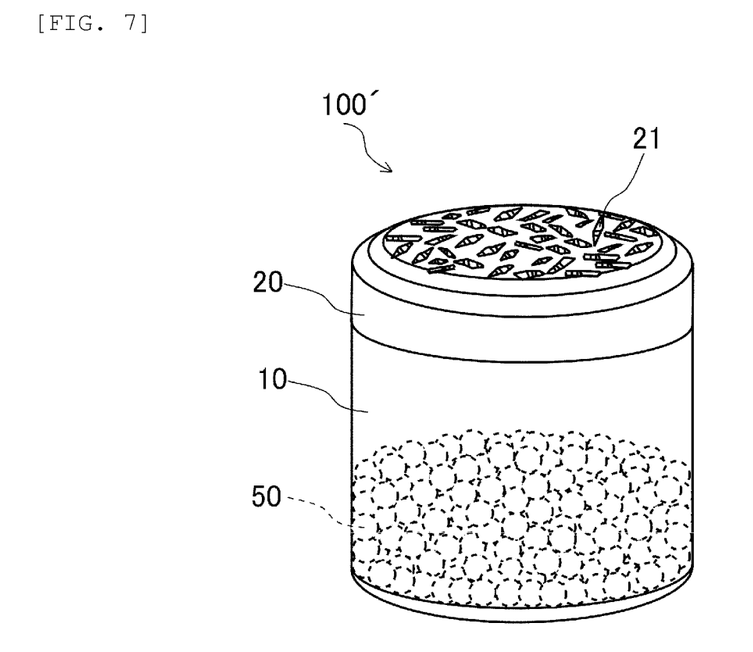
FIG. 7 is a perspective view of a flying insect pest repellent device using the vaporizing/discharging container of the first embodiment.

The vaporizing/discharging container of the present invention containing the thus-formulated aqueous gel bead type flying insect pest repellent containing the volatile substance can be used as the flying insect pest repellent device of the present invention. FIG. 7 is a perspective view of a flying insect pest repellent device 100' using the vaporizing/discharging container 100 of the first embodiment. The flying insect pest repellent device 100' contains an aqueous gel bead type flying insect pest repellent 50, with which the vaporizing/discharging container 100 is approximately half filled. The flying insect pest repellent device 100' is used in indoor places, such as an entrance, kitchen, bathroom, living room, bedroom, etc., spaces in a warehouse, car, etc., gardens, and outdoor places, to repel flying insect pests such as mosquitoes (*Culex pipiens pallens, Culex pipiens molestus, Aedes albopictus*, etc.), black flies, nonbiting midges, flies, small flies (Drosophilidae, Phoridae, etc.), drain flies, case-bearing clothes moths, etc., and has good safety and convenience.

INDUSTRIAL APPLICABILITY

The vaporizing/discharging container of the present invention is applicable to a flying insect pest repellent device, and in addition, other applications, such as a container for an air freshener, a container for seasoning, etc.

REFERENCE SIGNS LIST

10 MAIN BODY
20 CLOSURE MEMBER
21 VAPOR DISCHARGING HOLE
23 PACKING
30 TEMPORARY LOCK MECHANISM
31 MAIN BODY TEMPORARY LOCK PORTION
32 CLOSURE MEMBER TEMPORARY LOCK PORTION
40 MAIN LOCK MECHANISM
41 MAIN BODY MAIN LOCK UNIT
42 CLOSURE MEMBER MAIN LOCK UNIT
50 AQUEOUS GEL BEAD TYPE FLYING INSECT PEST REPELLENT
100, 200, 300 VAPORIZING/DISCHARGING CONTAINER
100' FLYING INSECT PEST REPELLENT DEVICE

The invention claimed is:

1. A vaporizing/discharging container for vaporizing and discharging a volatile substance outside the container, comprising:

a main body configured to contain the volatile substance;

a closure member having a vapor discharging hole for the volatile substance, and configured to be screwed and attached onto the main body, and a pair of temporary lock mechanisms configured to engage with each other so that resistance occurs against a direction in which the closure member is rotated backward after the closure member is screwed onto the main body, the pair of temporary lock mechanisms being provided between the closure member and the main body, at least one of the temporary lock mechanisms being formed in the shape of two steps extending radially outward, wherein when the closure member is screwed onto the main body, a first one of the pair of temporary lock mechanisms moves onto a first step of a second one of the pair of temporary lock mechanisms while the closure member is elastically deformed, and thereafter, when the closure member is further screwed onto the main body, the first one of the pair of temporary lock mechanisms moves onto and over a second step of the second one of the pair of temporary lock mechanisms while the closure member is further elastically deformed, and when the first one of the pair of temporary lock mechanisms has moved over the second one of the pair of temporary lock mechanisms, the closure member returns to an original state thereof from the elastically deformed state, wherein the second step extends further radially outward than the first step, and the first and second steps are part of a same outwardly extending lock mechanism.

2. The vaporizing/discharging container of claim 1, wherein the temporary lock mechanisms are provided at a portion on a circumference between the closure member and the main body.

3. The vaporizing/discharging container of claim 2, wherein when the closure member is screwed 1-1.5 revolutions after the closure member is aligned with the main body, the temporary lock mechanisms are engaged with each other.

4. The vaporizing/discharging container of claim 2, wherein a pair of main lock mechanisms configured to engage with each other to prevent the closure member from being rotated backward after the closure member is further screwed and moved over the temporary lock mechanisms, are provided between the closure member and the main body.

5. The vaporizing/discharging container of claim 2, wherein the temporary lock mechanisms are engaged with each other with a tightening torque of 10 kgf·m or more.

6. The vaporizing/discharging container of claim 1, wherein when the closure member is screwed 1-1.5 revolutions after the closure member is aligned with the main body, the temporary lock mechanisms are engaged with each other.

7. The vaporizing/discharging container of claim 6, wherein a pair of main lock mechanisms configured to engage with each other to prevent the closure member from being rotated backward after the closure member is further screwed and moved over the temporary lock mechanisms, are provided between the closure member and the main body.

8. The vaporizing/discharging container of claim 1, wherein the temporary lock mechanisms are engaged with each other with a tightening torque of 10 kgf·m or more.

9. The vaporizing/discharging container of claim 8, wherein a pair of main lock mechanisms configured to engage with each other to prevent the closure member from being rotated backward after the closure member is further screwed and moved over the temporary lock mechanisms, are provided between the closure member and the main body.

10. The vaporizing/discharging container of claim 1, further comprising:

a pair of main lock mechanisms configured to engage with each other to prevent the closure member from being rotated backward after the closure member is further screwed and moved over the temporary lock mechanisms, the pair of main lock mechanisms being provided between the closure member and the main body at different positions separated from the respective temporary lock mechanisms by respective predetermined angles.

11. The vaporizing/discharging container of claim 10, wherein the main lock mechanisms are engaged with each other with a tightening torque of 13 kgf·m or more.

12. The vaporizing/discharging container of claim 1, wherein the closure member is formed of a material having a modulus of elasticity higher than the modulus of elasticity of the main body.

13. The vaporizing/discharging container of claim 1, wherein the closure member includes a packing that is formed of a material more flexible than a material for the main body.

14. The vaporizing/discharging container of claim 1, wherein the volatile substance has a vapor pressure of 0.01-50 Pa at 20° C.

15. A flying insect pest repellent device using the vaporizing/discharging container of claim 1, wherein the volatile substance is an aqueous gel bead type flying insect pest repellent that is a water absorbent polymer containing an absorbed flying insect pest repellent aroma chemical composition including a flying insect pest repellent component, a repellent effect sustaining component, and water, and the volatile substance is contained in the flying insect pest repellent device.

* * * * *